United States Patent
Inao et al.

(10) Patent No.: US 9,947,439 B2
(45) Date of Patent: Apr. 17, 2018

(54) DARK EXTERIOR WIRE HARNESS WITH HEAT-REFLECTION AND IDENTIFICATION PORTION

(71) Applicant: YAZAKI CORPORATION, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinohara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 67 days.

(21) Appl. No.: 14/626,388

(22) Filed: Feb. 19, 2015

(65) Prior Publication Data
US 2015/0170796 A1    Jun. 18, 2015

Related U.S. Application Data

(63) Continuation of application No. PCT/JP2013/074264, filed on Sep. 9, 2013.

(30) Foreign Application Priority Data

Sep. 10, 2012    (JP) .................................. 2012-198584

(51) Int. Cl.
*H01B 7/29*    (2006.01)
*H01B 3/00*    (2006.01)
(Continued)

(52) U.S. Cl.
CPC .......... *H01B 7/292* (2013.01); *B60R 16/0215* (2013.01); *H01B 3/004* (2013.01); *H01B 7/0045* (2013.01)

(58) Field of Classification Search
None
See application file for complete search history.

(56) References Cited

U.S. PATENT DOCUMENTS 3,197,554 A * 7/1965 Baker ................... H01B 7/365
139/425 R
3,683,154 A * 8/1972 Kipple ..................... F26B 3/30
219/405

(Continued)

FOREIGN PATENT DOCUMENTS

CN    202042218    * 11/2011   ............... H01B 7/02
CN    202042218 U    11/2011
(Continued)

OTHER PUBLICATIONS

Extended European Search Report dated Apr. 7, 2016, by the European Patent Office in counterpart European Application No. 13835327.1.
(Continued)

*Primary Examiner* — Chau N Nguyen
*Assistant Examiner* — Muhammed Azam
(74) *Attorney, Agent, or Firm* — Sughrue Mion, PLLC (57) ABSTRACT

A wire harness includes at least one conductive path, and an exterior member that accommodates and protects the conductive path. The exterior member is a molded resin component made of a resin material which has a black color or a dark color close to the black color.

10 Claims, 6 Drawing Sheets

(51) Int. Cl.
*H01B 7/00* (2006.01)
*B60R 16/02* (2006.01)

(56) References Cited

U.S. PATENT DOCUMENTS

| | | | | |
|---|---|---|---|---|
| 3,842,192 | A * | 10/1974 | Hilker | H01B 7/292 |
| | | | | 174/120 SR |
| 3,906,139 | A * | 9/1975 | Hiraoka | C09D 5/4411 |
| | | | | 204/477 |
| 4,129,841 | A * | 12/1978 | Hildebrand | H01Q 13/203 |
| | | | | 333/237 |
| 5,350,885 | A * | 9/1994 | Falciglia | H01B 7/365 |
| | | | | 156/50 |
| 5,385,790 | A * | 1/1995 | Atkinson | B60R 13/08 |
| | | | | 428/126 |
| 5,614,144 | A | 3/1997 | Onishi et al. | |
| 5,656,353 | A * | 8/1997 | Butler | B60R 13/0869 |
| | | | | 156/251 |
| 5,756,570 | A * | 5/1998 | Hoch | C08K 3/0033 |
| | | | | 524/318 |
| 5,911,450 | A | 6/1999 | Shibata et al. | |
| 6,123,172 | A * | 9/2000 | Byrd | B32B 5/06 |
| | | | | 181/286 |
| 6,433,273 | B1 * | 8/2002 | Kenyon | B32B 5/02 |
| | | | | 174/110 R |
| 6,444,309 | B1 | 9/2002 | Hashimoto et al. | |
| 7,442,577 | B1 * | 10/2008 | Fitz | G02B 6/136 |
| | | | | 438/106 |
| 7,482,539 | B2 * | 1/2009 | Katsumata | H01B 13/34 |
| | | | | 174/110 R |
| 7,504,586 | B2 * | 3/2009 | Kamata | H01B 7/361 |
| | | | | 174/112 |
| 2002/0117321 | A1 * | 8/2002 | Beebe | H02G 3/32 |
| | | | | 174/72 A |
| 2002/0170729 | A1 * | 11/2002 | Murakami | B60R 16/0215 |
| | | | | 174/386 |
| 2003/0059562 | A1 * | 3/2003 | Lien | B60R 16/0215 |
| | | | | 428/36.9 |
| 2003/0168248 | A1 * | 9/2003 | Savoy | B60R 16/0215 |
| | | | | 174/136 |
| 2003/0207106 | A1 * | 11/2003 | Nakamura | B60R 16/0215 |
| | | | | 428/355 EN |
| 2003/0217864 | A1 * | 11/2003 | Ishikawa | B60R 16/0207 |
| | | | | 174/135 |
| 2004/0222013 | A1 * | 11/2004 | Lindner | H02G 3/0468 |
| | | | | 174/135 |
| 2004/0238275 | A1 * | 12/2004 | Keller | G10K 11/168 |
| | | | | 181/286 |
| 2005/0011687 | A1 | 1/2005 | Yamaguchi et al. | |
| 2005/0140180 | A1 * | 6/2005 | Hesch | B60R 21/0428 |
| | | | | 296/208 |
| 2005/0252676 | A1 * | 11/2005 | McMillan | H01B 7/361 |
| | | | | 174/112 |
| 2006/0021785 | A1 * | 2/2006 | Kamata | H01B 7/361 |
| | | | | 174/112 |
| 2006/0070766 | A1 * | 4/2006 | Katsumata | H01B 13/34 |
| | | | | 174/112 |
| 2006/0102379 | A1 * | 5/2006 | Suzuki | H01B 7/36 |
| | | | | 174/110 R |
| 2006/0118325 | A1 * | 6/2006 | Yagi | H01B 13/345 |
| | | | | 174/135 |
| 2006/0131044 | A1 * | 6/2006 | Vertente | H02G 3/0468 |
| | | | | 174/47 |
| 2006/0167158 | A1 * | 7/2006 | Yagi | C08L 23/06 |
| | | | | 524/436 |
| 2007/0151539 | A1 * | 7/2007 | Upton | B60R 13/0869 |
| | | | | 123/198 E |
| 2007/0191755 | A1 * | 8/2007 | Sellis | B60R 16/0222 |
| | | | | 604/15 |
| 2007/0218790 | A1 * | 9/2007 | Schradin | B32B 7/02 |
| | | | | 442/38 |
| 2009/0095525 | A1 * | 4/2009 | Watanabe | B60R 16/0207 |
| | | | | 174/70 R |
| 2009/0261308 | A1 * | 10/2009 | Hirano | H01B 3/445 |
| | | | | 252/567 |
| 2009/0268278 | A1 * | 10/2009 | Suzuki | B32B 27/20 |
| | | | | 359/359 |
| 2009/0281228 | A1 * | 11/2009 | Kamata | C09D 11/107 |
| | | | | 524/503 |
| 2010/0294533 | A1 * | 11/2010 | Yagi | H01B 7/361 |
| | | | | 174/112 |
| 2011/0275268 | A1 * | 11/2011 | Harris | H02G 3/0481 |
| | | | | 442/319 |
| 2012/0211256 | A1 * | 8/2012 | Karayianni | H01B 3/448 |
| | | | | 174/110 D |
| 2012/0312596 | A1 * | 12/2012 | Taniguchi | H01B 7/36 |
| | | | | 174/72 A |
| 2013/0008711 | A1 | 1/2013 | Toyama et al. | |
| 2013/0264147 | A1 * | 10/2013 | Sugimoto | B61D 17/185 |
| | | | | 181/292 |
| 2013/0284487 | A1 * | 10/2013 | Izawa | H01B 7/29 |
| | | | | 174/107 |
| 2015/0136482 | A1 * | 5/2015 | Adachi | B60R 16/0215 |
| | | | | 174/72 A |
| 2015/0136483 | A1 * | 5/2015 | Inao | H01B 7/2825 |
| | | | | 174/72 A |
| 2015/0175098 | A1 * | 6/2015 | Inao | H02G 3/0412 |
| | | | | 174/72 A |
| 2015/0179300 | A1 * | 6/2015 | Inao | B60R 16/0215 |
| | | | | 174/68.3 |
| 2015/0179312 | A1 * | 6/2015 | Inao | B60R 16/0215 |
| | | | | 29/887 |
| 2015/0217708 | A1 * | 8/2015 | Adachi | H02G 3/0468 |
| | | | | 174/72 A |
| 2015/0224945 | A1 * | 8/2015 | Inao | B60R 16/0207 |
| | | | | 174/72 A |

FOREIGN PATENT DOCUMENTS

| | | |
|---|---|---|
| EP | 1329491 A2 | 7/2003 |
| JP | 04-061413 U | 5/1992 |
| JP | 6226883 A | 8/1994 |
| JP | 09-213141 A | 8/1997 |
| JP | 2000-007902 A | 1/2000 |
| JP | 2000-028078 A | 1/2000 |
| JP | 2000-287331 A | 10/2000 |
| JP | 2001-42776 A | 2/2001 |
| JP | 2004-224156 A | 8/2004 |
| JP | 2008228466 A | 9/2008 |
| JP | 2011-193677 A | 9/2011 |

OTHER PUBLICATIONS

Written Opinion, Issued by the International Searching Authority, Dated Oct. 8, 2013, in counterpart International Application No. PCT/JP2013/074264.
International Search Report for PCT/JP2 013/074264 dated Oct. 8, 2013 [PCT/ISA/210].
Written Opinion for PCT/JP2 013/074264 dated Oct. 8, 2013 [PCT/ISA/237].
Office Action dated Jul. 19, 2016, issued by the Japanese Patent Office in counterpart Japanese Application No. 2012-198584.
Office Action dated Jul. 27, 2016, by the State Intellectual Property Office of P.R. China in counterpart Chinese Application No. 201380047200.6.
Communication dated Nov. 25, 2016, issued by the Japanese Patent Office in counterpart Japanese Patent Application No. 2012-198584.
Communication dated Feb. 16, 2017 issued by the State Intellectual Property Office of the People's Republic of China in counterpart Chinese Patent Application No. 201380047200.6.
Office Action dated Aug. 2, 2017, issued by the State Intellectual Property Office of P.R. China in counterpart Chinese Application No. 201380047200.6.

* cited by examiner

DARK EXTERIOR WIRE HARNESS WITH HEAT-REFLECTION AND IDENTIFICATION PORTION

CROSS REFERENCE TO RELATED APPLICATIONS

This application is a continuation of international patent application No. PCT/JP2013/074264, which was filed on Sep. 9, 2013 based on Japanese Patent Application No. 2012-198584 filed on Sep. 10, 2012, the contents of which are incorporated herein by reference.

BACKGROUND OF THE INVENTION

1. Field of the Invention

The present invention relates to a wire harness that includes at least one conductive path, and an exterior member which accommodates and protects the conductive path.

2. Description of the Related Art

Typically, high-tension (that is, high-voltage) wire harnesses electrically connect a battery to an inverter unit, and the inverter unit to a motor unit in a hybrid vehicle or an electric vehicle. A wire harness disclosed in JP-A-2004-224156 includes a high-tension electric wire which is a high-tension conductive path, and an exterior member that accommodates the high-tension electric wire.

SUMMARY OF THE INVENTION

In the related art, when an electric wire accommodating space of the exterior member is collected with heat originating from the high-tension electric wire, the temperature of the high-tension electric wire may increase due to the collected heat. In addition, when the collected heat cannot be efficiently transferred to the exterior member, and cannot be efficiently radiated from the exterior member to the outside, the temperature of the high-tension electric wire is unlikely to decrease.

The present invention is made in light of the problems, and a non-limited object of the present invention is to provide a wire harness that can efficiently absorb heat originating from a high-tension electric wire, and can efficiently radiate the heat to the outside.

A wire harness according to aspects of the present invention is formed as the following configurations (1) to (9).

(1) A wire harness including: at least one conductive path; and an exterior member that accommodates and protects the conductive path, wherein the exterior member is a molded resin component made of a resin material which has a black color or a dark color close to the black color.

(2) The wire harness according to the configuration (1), wherein the exterior member is formed to have a tubular shape.

(3) The wire harness according to the configuration (1) or (2), wherein the exterior member includes a portion attached to a vehicle floor.

(4) The wire harness according to any one of the configurations (1) to (3), wherein the exterior member includes, on an outer surface, at least one of an identification portion for identifying the conductive path, and a heat reflecting portion for reflecting heat from outside.

(5) The wire harness according to the configuration (4), wherein the heat reflecting portion is formed via bi-color molding.

(6) The wire harness according to the configuration (4), wherein the heat reflecting portion is formed via painting or vapor deposition.

(7) The wire harness according to the configuration (4), wherein the heat reflecting portion is formed as an add-on component or an add-on member which is added to an outer surface of the exterior member.

(8) The wire harness according to any one of the configurations (5) to (7), wherein the heat reflecting portion is formed as a portion which has a white color or a bright color close to the white color, or is formed as a portion which is also glossy.

(9) The wire harness according to the configuration (7), wherein the heat reflecting portion is formed as a mirrored portion.

According to the wire harness in the configuration (1) above, since the conductive path is accommodated in the exterior member made of a resin material which has a black color or a dark color close to the black color, the inner and outer surfaces of the exterior member have the black color, or the dark color close to the black color. Accordingly, the exterior member can more efficiently absorb heat originating from the conductive path, and can more efficiently radiate the heat to the outside.

In the wire harness according to the configuration (2) above, since the exterior member formed to have a tubular shape is applied to the wire harness, the exterior member can efficiently absorb heat originating from the high-tension electric wire of the wire harness, and can more efficiently radiate the heat to the outside.

In the wire harness according to the configuration (3) above, since the exterior member is applied to the wire harness having a long total length which is routed underneath the vehicle floor, the exterior member can efficiently absorb heat originating from the high-tension electric wire of the wire harness, and can more efficiently radiate the heat to the outside.

According to the wire harness in the configuration (4) above, it is possible to obtain the following effects in addition to the effects in the configurations (1) to (3) above. That is, for example, since the wire harness has the identification portion on the outer surface of the exterior member, the identification portion can identify that a high-tension conductive path is accommodated and protected. The wire harness has the heat reflecting portion on the outer surface of the exterior member, and thereby the heat reflecting portion can reflect heat from the outside, and thermal impact on the conductive path can be reduced and prevented.

According to the wire harness in the configuration (5) above, it is also possible to obtain the following effects in addition to the effects in the configuration (4) above. That is, it is possible to reflect heat from the outside using the heat reflecting portion which is formed via bi-color molding.

According to the wire harness in the configuration (6) above, it is also possible to obtain the following effects in addition to the effects in the configuration (4) above. That is, it is possible to reflect heat from the outside using the heat reflecting portion which is formed via painting or vapor deposition.

According to the wire harness in the configuration (7) above, it is also possible to obtain the following effects in addition to the effects in the configuration (4) above. That is, it is possible to reflect heat from the outside using the heat reflecting portion that is formed as an add-on component or an add-on member which is added to the outer surface of the exterior member.

According to the wire harness in the configuration (8) above, it is also possible to obtain the following effects in addition to the effects in the configurations (5) to (7) above. That is, it is possible to reflect heat from the outside using the heat reflecting portion that is formed as a portion which has a white color or a bright color close to the white color, or is formed as a portion which is also glossy.

According to the wire harness in the configuration (9) above, it is also possible to obtain the following effects in addition to the effects in the configuration (7) above. That is, it is possible to reflect heat from the outside using the heat reflecting portion that is formed as a mirrored portion.

DETAILED DESCRIPTION OF THE EXEMPLARY EMBODIMENTS

Each of wire harnesses according to embodiments which will be described below includes at least one conductive path, and an exterior member that accommodates and protects the conductive path. The exterior member is a molded resin component, and is made of a resin material which has a black color or a dark color close to the black color. The exterior member is formed to have a tubular shape. The exterior member has a portion attached to a vehicle floor.

Embodiment 1

Figure 1:
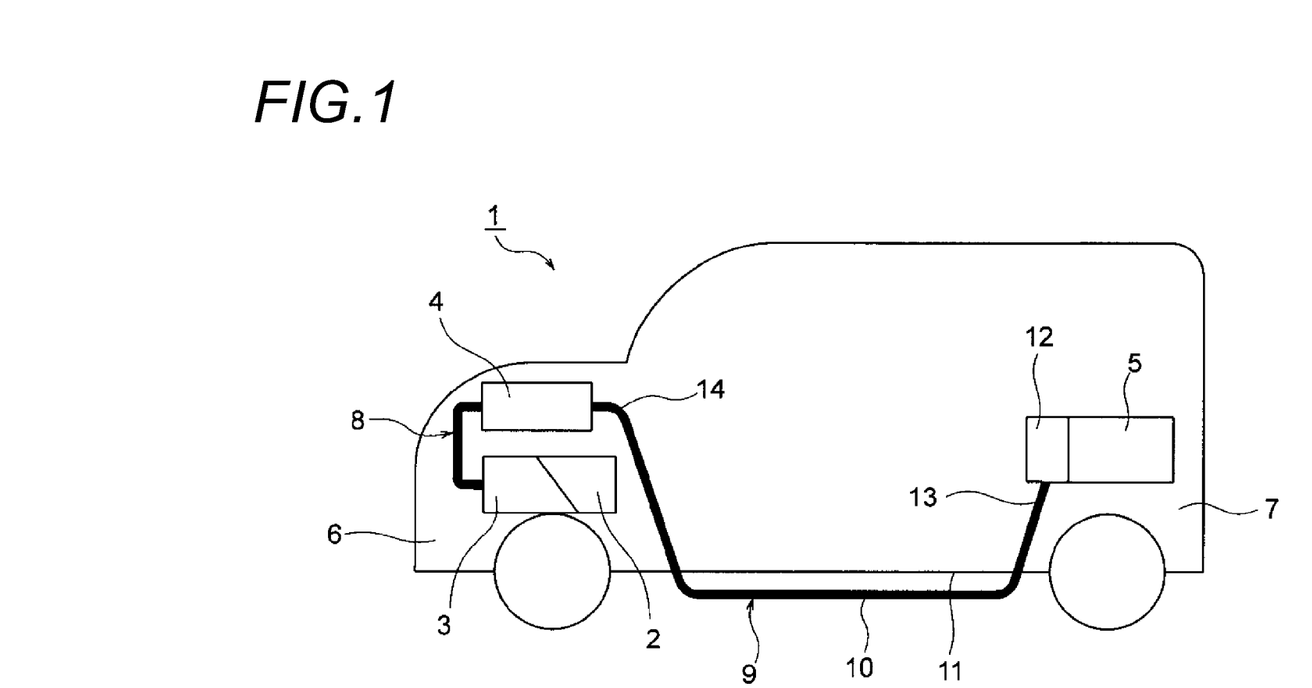
FIG. 1 is a schematic diagram illustrating the routing of a wire harness.
Figure 2:
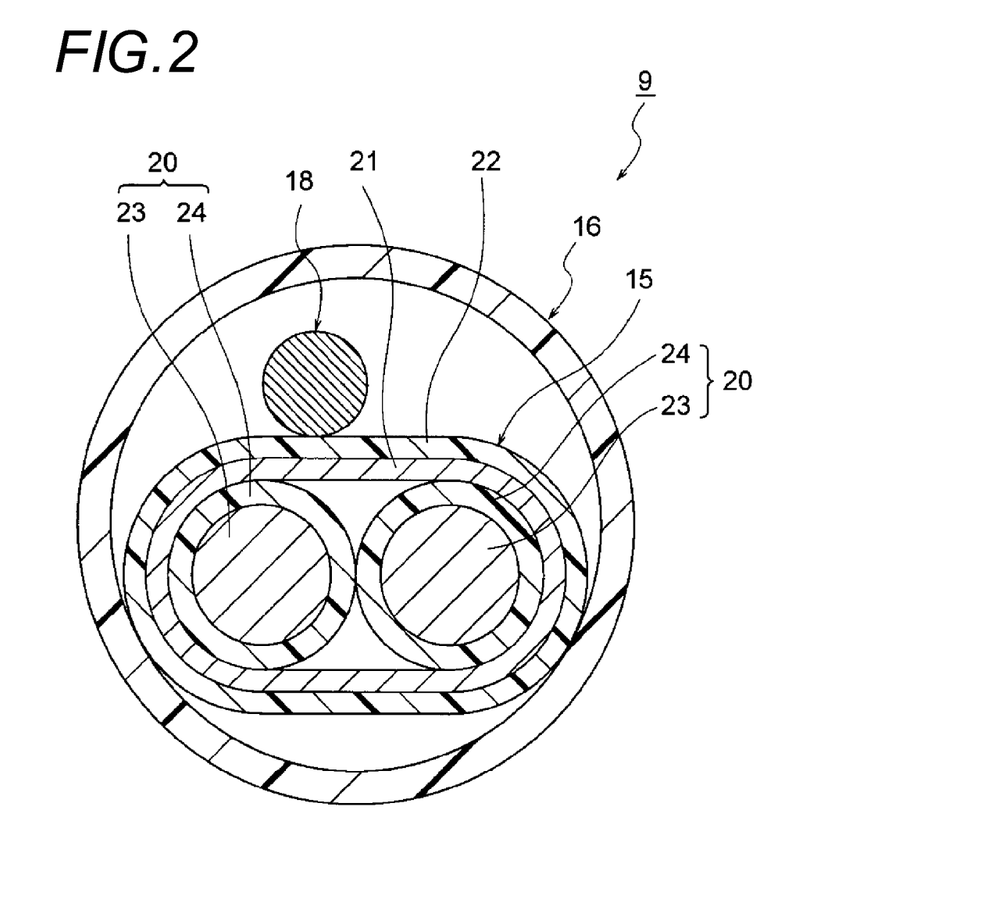
FIG. 2 is a diagram illustrating the configuration of the wire harness.
Figure 3:
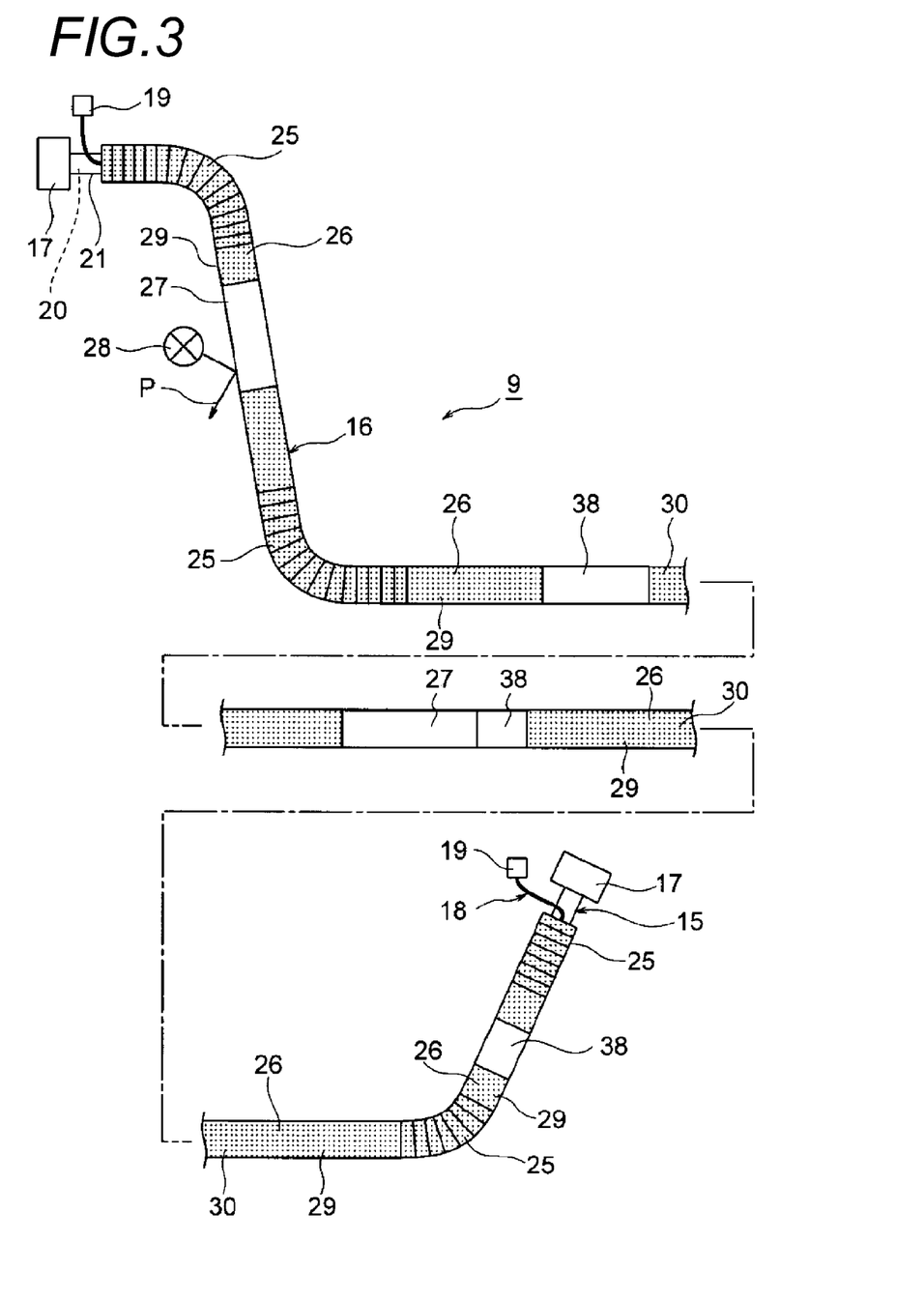
FIG. 3 is a diagram illustrating the configuration of an exterior member.

Hereinafter, a wire harness according to Embodiment 1 will be described with reference to FIGS. 1 to 4D. FIG. 1 is a schematic diagram illustrating the routing of the wire harness. FIG. 2 is a diagram illustrating the configuration of the wire harness, FIG. 3 is a diagram illustrating the configuration of an exterior member, and FIGS. 4A to 4D are diagrams illustrating examples of a heat reflecting portion and an identification portion.

In the following example, the wire harness according to Embodiment 1 is routed in a hybrid vehicle (may be an electric vehicle or a general vehicle).

In FIG. 1, reference sign 1 indicates a hybrid vehicle. The hybrid vehicle 1 is a vehicle that is driven by the combination of two power sources such as an engine 2 and a motor unit 3. A battery 5 (in other words, battery pack) supplies electrical power to the motor unit 3 via an inverter unit 4. In this example, the engine 2, the motor unit 3, and the inverter unit 4 are mounted in an engine compartment 6 close to front wheels and the like. The battery 5 is mounted in a vehicle rear portion 7 close to rear wheels and the like. The battery 5 may be mounted in the interior of vehicle which is positioned at the back of the engine compartment 6.

The motor unit 3 and the inverter unit 4 are electrically connected to each other via a high-tension wire harness 8. The battery 5 and the inverter unit 4 are also electrically connected to each other via a high-tension wire harness 9. A middle portion 10 of the wire harness 9 is routed underneath a vehicle floor 11. The wire harness 9 is routed along the vehicle floor 11, and in substantially parallel therewith. The vehicle floor 11 is a well-known body, and is formed of a so-called panel member, and a thru-hole (not illustrated) is formed at a predetermined position of the vehicle floor 11. The wire harness 9 is inserted through the thru-hole.

The wire harness 9 and the battery 5 are electrically connected to each other via a junction block 12 of the battery 5. A rear end 13 of the wire harness 9 is electrically connected to the junction block 12 using a well-known method. A front end 14 of the wire harness 9 is electrically connected to the inverter unit 4 using a well-known method.

The motor unit 3 includes a motor (not illustrated) and a generator (not illustrated). The inverter unit 4 has an inverter (not illustrated) and a converter (not illustrated). The motor unit 3 is formed as a motor assembly that includes a shielding case (not illustrated). The inverter unit 4 is also formed as an inverter assembly that includes a shielding case (not illustrated). The battery 5 is a Ni-MH battery or a Li-ion battery, and is formed into a module. In addition, it is also possible to use an electrical power storage device such as a capacitor. The battery 5 is not particularly limited to a specific form of battery insofar as the battery 5 can be used in the hybrid vehicle 1 or an electric vehicle.

Subsequently, the configuration and structure of the wire harness 9 will be described.

In FIG. 2, the wire harness 9 includes a high-tension conductive path 15; an exterior member 16 that accommodates and protects the high-tension conductive path 15; and a shield connector 17 (refer to FIG. 3) that is provided at a terminal of the high-tension conductive path 15. The exterior member 16 accommodates a low-tension conductive path 18 together with the high-tension conductive path 15. This is an example of the configuration, and the low-tension conductive path 18 is optionally accommodated as necessary. A connector 19 (refer to FIG. 3) is provided at a terminal of the low-tension conductive path 18. The wire harness 9 is attached to the vehicle floor 11 (refer to FIG. 1) via clamps (not illustrated).

The high-tension conductive path 15 includes two high-tension circuits 20; a shielding member 21 that covers the two high-tension circuits 20; and a sheath 22 that is provided on an outer side of the shielding member 21. This is an example of the configuration.

The high-tension circuit 20 is a well-known high-tension electric wire, and includes a conductor 23 and an insulator 24 with which the conductor 23 is coated. The high-tension circuit 20 has a length necessary for electrical connection. Since the wire harness 9 electrically connects the inverter unit 4 and the battery 5 (or the junction block 12), the high-tension circuit 20 is formed to have a long length (refer to FIG. 1).

The conductor 23 is made of copper, a copper alloy, aluminum, or an aluminum alloy. The conductor 23 has a conductor structure in which wires are twisted together, or a conductor structure having a bar shape which has a rectangular cross section or a round cross section (for example, a conductor structure in which the conductor has a straight angle single core or a round single core). The high-tension circuit 20 is formed by extrusion-molding the insulator 24 made of an insulating resin material on an outer surface of the conductor 23.

In Embodiment 1, the high-tension circuit 20 adopts the configuration of a well-known high-tension electric wire, but the configuration is not limited to that in Embodiment 1.

That is, a high-tension conductive circuit may be also adopted as the high-tension circuit 20, which is obtained by providing an insulator on a well-known bus bar.

The shielding member 21 is an electromagnetic shielding member (that is, a shielding member acting as a countermeasure for electromagnetic waves) that collectively covers the two high-tension circuits 20, and a well-known braid is used as the shielding member 21, which is formed by braiding a large number of wires into a cylindrical shape. The shielding member 21 is formed to have substantially the same total length as that of the two high-tension circuits 20. An end portion of the shielding member 21 is electrically connected to the shielding case and the like (not illustrated) of the inverter unit 4 (refer to FIG. 1) via a high tension-side connecting portion (not illustrated).

A metal foil having conductivity or a member containing the metal foil may be adopted as the material of the shielding member 21 insofar as the material can act as a countermeasure for electromagnetic waves.

An insulating resin material is extrusion-molded on the outer side of the shielding member 21 so that the sheath 22 having a predetermined thickness is formed. The sheath 22 is an outermost layer disposed at the outermost of the high-tension conductive path 15. When the wire harness 9 is produced, an end of the sheath 22 is processed in such a manner that the shielding member 21 is exposed in a predetermined length. After the end of the sheath 22 is processed, the sheath 22 has a length slightly greater than that of the exterior member 16.

An example of conductive paths other than the high-tension conductive path 15 is a high-tension coaxial composite conductive path 32 which will be described later with reference to FIG. 6. In addition, another example of the conductive path is a well-known shielded electric wire or the like. The number of conductive paths in use is not limited to a specific number.

In FIG. 3, the exterior member 16 is a tubular member for accommodating and protecting the high-tension conductive path 15. The exterior member 16 has bending tube portions 25; non-bending tube portions 26; and heat reflecting portions 27, and is molded of a resin material in such a manner that the entirety of the bending tube portion 25 and the non-bending tube portion 26 form a substantially straight line when finished. In Embodiment 1, the bending tube portion 25 and the non-bending tube portion 26 of the exterior member 16 are made of resin; however, the material is not limited to resin, and the bending tube portion 25 and the non-bending tube portion 26 may be made of metal.

The bending tube portion 25 is a portion which is bent during the transportation of the wire harness 9, or the routing of a path thereof, and the non-bending tube portion 26 is continuous with the bending tube portion 25. The non-bending tube portion 26 is provided as a portion which will not be bent (in other words, is unlikely to be bent). Each of the bending tube portion 25 and the non-bending tube portion 26 is disposed at a position and is formed to have a length in such a manner that the bending tube portion 25 and the non-bending tube portion 26 conform to a vehicle attachment shape. The bending tube portion 25 and the non-bending tube portion 26 are formed in such a manner that respective cross sections thereof fit each other. That is, if the bending tube portion 25 is formed to have a circular cross section, the non-bending tube portion 26 is also formed to have a circular cross section, and if the bending tube portion 25 is formed to have a substantially rectangular cross section, the non-bending tube portion 26 is also formed to have a substantially rectangular cross section.

In Embodiment 1, a plurality of bending tube portions 25 and a plurality of non-bending tube portion 26 are provided, but the numbers of bending tube portions 25 and non-bending tube portions 26 are not particularly limited to specific numbers. That is, configurations may be adopted such that one bending tube portion 25 is provided, and the non-bending tube portions 26 are respectively formed on opposite sides of the bending tube portion 25, and are continuous with the bending tube portion 25. Alternatively, configurations may be adopted such that one non-bending tube portion 26 is provided, and the bending tube portions 25 are respectively formed on opposite sides of the non-bending tube portion 26, and are continuous with the non-bending tube portion 26.

The heat reflecting portion 27 and the identification portion 38 are disposed and formed on a part of an outer surface of the exterior member 16. In Embodiment 1, the heat reflecting portion 27 and the identification portion 38 are disposed and formed in the non-bending tube portion 26. This is an example of the configuration. The heat reflecting portion 27 and/or the identification portion 38 may or may not be present in the non-bending tube portion 26.

The plurality of heat reflecting portions 27 are provided so as to reflect outside heat as illustrated by arrow P, which will be described later. For example, the outside heat is heat from a heat source 28. In Embodiment 1, one heat source 28 is illustrated, but the number of heat sources is not limited to one.

For example, the heat source 28 in FIG. 3 is the engine 2 (refer to FIG. 1) or an exhaust manifold (alternatively, the engine 2 or the motor unit 3, and the exhaust manifold).

Since the exterior member 16 accommodates and protects the high-tension conductive path 15 which is a high-voltage path, a plurality of the identification portions 38 are provided to identify the high-tension conductive path 15. The disposition and the number of configurations are illustrated as an example in FIG. 3.

More detailed description of the exterior member 16 will be also given.

The bending tube portion 25 is formed to have a bellows shape, in which a plurality of concave portions and convex portions are continuously provided while extending in a circumferential direction. The length of the bending tube portion 25 is set according to a bending range. The bending tube portion 25 is formed as a portion that has plasticity (in other words, flexibility) and is bendable. In Embodiment 1, the bending tube portion 25 is formed to have the same shape as that of a well-known corrugated tube. Insofar as the bending tube portion 25 is bendable, the shape is not limited to the bellows shape.

As described above, since the exterior member 16 has a portion, the shape of which is the same as that of the corrugated tube, the exterior member 16 can be considered as a "corrugated tube", a "partial corrugated tube", or the like.

The non-bending tube portion 26 has a non-bending tube portion body 29. As described above, the non-bending tube portion body 29 is formed as a portion that will not be bent during the transportation of the wire harness 9 or the routing of a path of the wire harness 9. The portion which will not be bent refers to a portion that does not have positive flexibility characteristics. The non-bending tube portion body 29 is formed to have a straight shape having a circular cross section, that is, a straight tubular shape. The cross section of the non-bending tube portion body 29 is not limited to a circular shape, and may have an elliptical shape, an oblong circular shape, a substantially rectangular shape, or the like.

The thickness of the non-bending tube portion body 29 is set to a thin thickness required to demonstrate minimum necessary strength. In addition to the heat reflecting portion 27, the non-bending tube portion body 29 may be provided with another portion, for example, a portion for increasing rigidity or a portion for ensuring chipping resistance.

The exterior member 16 is formed not to have slits (that is, slits in the tube wall) along the tube axis. The reason for the non-provision of the slits is ensuring of rigidity or strength. Another reason is that the intrusion of water into the exterior member 16 is prevented and waterproof properties improve. In addition, for example, another reason is that the high-tension conductive path 15 does not jut out over bent portions.

The exterior member 16 has an underfloor non-bending tube portion 30 as the non-bending tube portion 26, which is routed underneath the vehicle floor 11 (refer to FIG. 1). Since the underfloor non-bending tube portion 30 is routed underneath the vehicle floor 11 (for example, since the underfloor non-bending tube portion 30 is routed along a reinforcement member), the underfloor non-bending tube portion 30 is formed to have a long length.

The exterior member 16 is molded of an appropriately selected resin material which easily absorbs heat from the high-tension conductive path 15 accommodated in the exterior member 16, or which easily radiates heat to the outside. Specifically, the exterior member 16 is molded of a resin material which has a black color or a dark color close to the black color.

For example, it is known that a black color absorbs all the light (for example, a spectrum of red light to violet light for sun light). That is, since a black colored surface easily absorbs heat, it is effective that the surface is painted with a black color.

The dark color is preferably a short wavelength of color. In addition, it was confirmed from experiments that an orange colored exterior member made of resin absorbs heat and radiates the heat to the outside more efficiently than a pure exterior member made of aluminum, and a black colored exterior member made of resin absorbs heat and radiates the heat to the outside more efficiently than the orange colored exterior member.

According to the Kirchhoff's Law of Thermal Radiation, it is known that when a certain object easily radiates heat, the object easily absorbs heat to the extent that the object easily radiates heat. Accordingly, when the exterior member 16 is molded of a resin material which has a black color or a dark color close to the black color, the exterior member 16 can more efficiently absorb heat originated from the high-tension conductive path 15 and can more efficiently radiate the heat to the outside.

In FIG. 3 and FIGS. 4A to 4D, the heat reflecting portion 27 is formed as a portion that serves to reflect heat from the outside. Since the heat reflecting portion 27 reflects heat from the outside, the heat reflecting portion 27 is disposed at a desired position, and is formed to have a desired range. In addition to serving to reflect heat, the heat reflecting portion 27 also serves to prevent heat from being easily absorbed, or to shut off heat from the outside.

For example, the heat reflecting portion 27 is formed to have a white color or a bright color close to the white color, or is formed as a portion which is also glossy. In another example, the heat reflecting portion 27 is formed as a mirrored portion. Hereinafter, more specific description will be given.

Figure 4A:
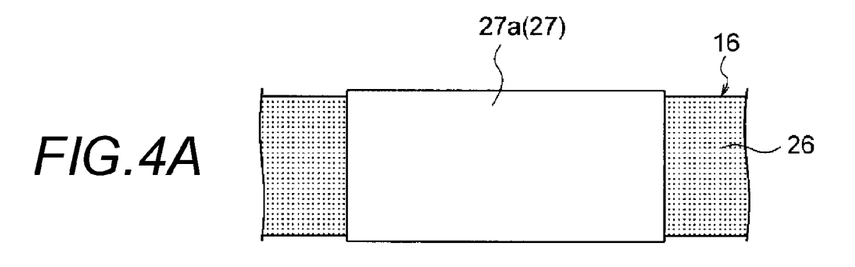
FIGS. 4A to 4D are diagrams illustrating examples of a heat reflecting portion and an identification portion.

In the example illustrated in FIG. 4A, a heat reflecting portion 27*a* is formed via bi-color molding or is formed as a portion which is finished by painting or vapor deposition.

Figure 4B:
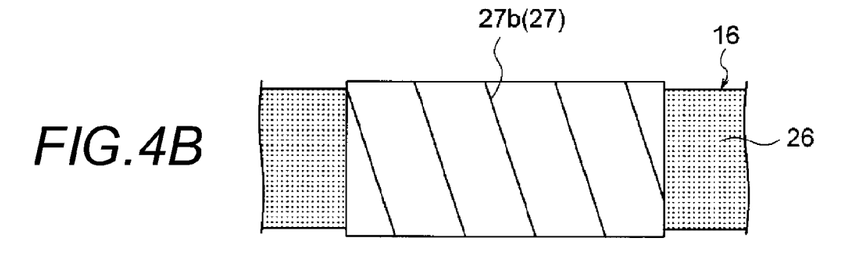

In the example illustrated in FIG. 4B, the heat reflecting portion 27*b* is formed as an add-on component. The heat reflecting portion 27*b* is formed as an add-on component that is added to the outer surface of the exterior member 16. An example of the add-on component is aluminum foil tape, "the surface of which shines brightly" (that is, a glossy surface). A heat reflecting portion 27*c* is formed by wrapping an add-on component around the outer surface of the exterior member 16. A winding method is not limited to that illustrated in FIG. 4C. The heat reflecting portion 27*c* may be formed by adhering the add-on component to only a portion of the exterior member 16, which is close to the heat source.

Figure 4C:
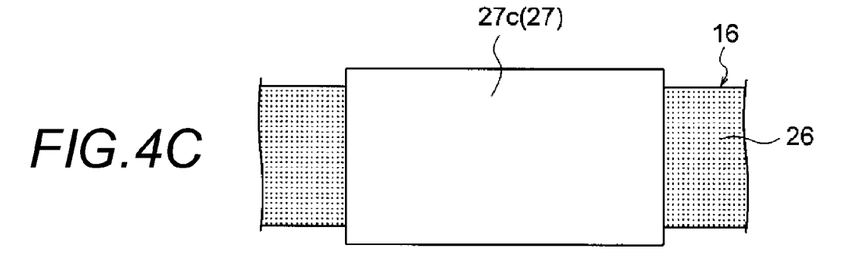
Figure 4D:
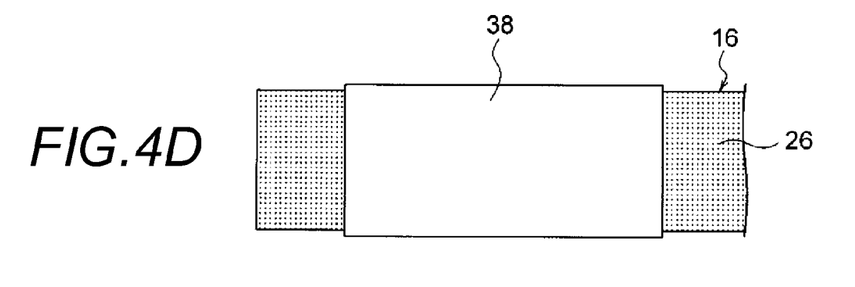

In FIG. 4C, the heat reflecting portion 27*c* is formed as an add-on component. A heat reflecting portion 27*d* is formed as an add-on component that is added to the outer surface of the exterior member 16. For example, the add-on component is a mirror component having a bipartite structure, and at this time, the add-on component is integrated with the exterior member 16 by interposing the exterior member 16 between the bipartite add-on component.

In addition to being the above-mentioned mirror component, the add-on component may be an add-on component which has a white color or a bright color close to the white color, and "the surface of which shines brightly" (that is, a glossy surface).

For example, it is known that a white color reflects all the light (for example, sunlight containing a spectrum of red light to violet light). That is, since it is difficult for a white colored surface to absorb heat, a white colored add-on component is effective for reflecting heat.

For example, a protector or a clamp which is well known can be adopted as an add-on component. The protector or the clamp is not a component that originally has a function of reflecting heat from the outside; however, if a part of the protector or the clamp is disposed at a position in which it is necessary to reflect heat, the part may be formed to function as the heat reflecting portion.

With regard to the heat reflecting portion 27, configurations may be adopted such that the colors of the outer surface of the exterior member 16 are separated into bright colors other than a white color and typical dark colors, and the dark colored portion functions as the heat reflecting portion 27. When the heat reflecting portion 27 is also formed in this manner, it is possible to obtain the above-mentioned effects.

In FIGS. 3 and 4(*d*), the identification portion 38 is formed to identify that a conductive path is a high voltage path. Here, the identification portion 38 is formed as an orange colored portion. The identification portion 38 is formed of any one of a resin layer formed by extrusion-molding a resin material (for example, polypropylene (PP)), a tube made of an elastomer, a heat shrinkable tube, and painting, or a member equivalent to any one of these.

The identification portion 38 is disposed and formed at a position which is effective for identifying that a conductive path is a high voltage path. The identification portion 38 may be disposed and formed in the vicinity of the heat reflecting portion 27, or to be continuous with the heat reflecting portion 27. The heat reflecting portion 27 is disposed and formed at a position in which it is necessary to reflect heat from the outside; however, if the position of the disposition of the heat reflecting portion 27 is effective for identifying that a conductive path is a high voltage path, it is effective that the identification portion 38 is provided to be continuous with the heat reflecting portion 27.

Subsequently, a method for producing the wire harness 9 will be described based on the above-mentioned configuration and structure.

Each of the high-tension conductive path 15, the exterior member 16, and the low-tension conductive path 18 is produced in advance in a predetermined length while being in a truly straight state. In the following step, the high-tension conductive path 15 and the low-tension conductive path 18 are individually or collectively inserted into the exterior member 16. An operator performs a step of providing the shield connector 17 at the terminal of the high-tension conductive path 15 and the connector 19 at the terminal of the low-tension conductive path 18. As such, the production of the wire harness 9 is completed.

The respective circuit terminal portions of the two high-tension circuits 20 are pulled out of the end of the exterior member 16, in a state where the circuit terminal portions are covered with a shielding end portion of the shielding member 21. Separately from the high-tension conductive path 15, the low-tension conductive path 18 is also pulled out of the end of the exterior member 16.

According to the wire harness 9 described above with reference to FIGS. 1 to 4(d), the following effects are obtained: the high-tension conductive path 15 is accommodated in the exterior member 16 made of a resin material which has a black color or a dark color close to the black color, thereby the inner and outer surfaces of the exterior member 16 have the black color, or the dark color close to the black color, and the exterior member 16 can more efficiently absorb heat originating from the high-tension conductive path 15, and can more efficiently radiate the heat to the outside.

According to the wire harness 9, the following effects are obtained: the wire harness 9 has the plurality of heat reflecting portions 27 on an outer side of the exterior member 16, thereby the heat reflecting portions 27 can reflect heat from the outside, and thermal impact on the high-tension conductive path 15 can be reduced and prevented.

In addition, according to the wire harness 9, the following effects are obtained: the wire harness 9 has the plurality of identification portions 38 on the outer side of the exterior member 16, and thereby it is possible to identify that the high-tension conductive path 15 is accommodated and protected.

Embodiment 2

Figure 5:
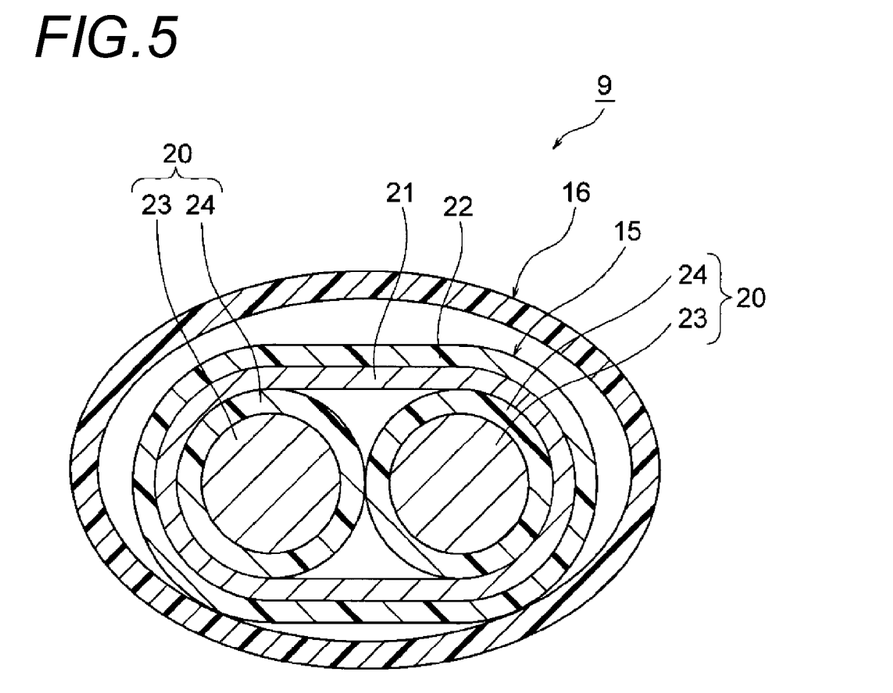
FIG. 5 is a diagram illustrating the configuration of a wire harness according to Embodiment 2.

The configuration of a wire harness according to Embodiment 2 will be described with reference to FIG. 5. FIG. 5 is a diagram illustrating the configuration of the wire harness according to Embodiment 2. The same reference numerals and signs will be assigned to the basically same configuration members as in Embodiment 1, and detailed description will be omitted.

In FIG. 5, the wire harness 9 includes the high-tension conductive path 15; the exterior member 16 that accommodates and protects the high-tension conductive path 15; and the shield connector 17 (refer to FIG. 3) that is provided at the terminal of the high-tension conductive path 15. The exterior member 16 may be formed to have not only a circular cross section as in Embodiment 1, but also an elliptical cross section (may be an oblong circular cross section) so that the shape of the exterior member 16 conforms to an exterior shape of the high-tension conductive path 15. The plurality of heat reflecting portions 27 and the plurality of identification portions 38 (refer to FIG. 3) are provided in the exterior member 16.

Since the exterior member 16 has an elliptical cross section, the exterior member 16 has a height dimension less than that in Embodiment 1, and there are advantages in that the distance between the exterior member 16 and the ground can be ensured when the exterior member 16 is attached to the vehicle floor 11 (refer to FIG. 1). There are advantages in that the exterior member 16 has an elliptical cross section, thereby it is possible to increase an occupancy ratio of the high-tension conductive path 15 in the inner space of the exterior member 16, and heat can easily transfer from the high-tension conductive path 15 to the exterior member 16. Heat from the outside is reflected from the heat reflecting portion 27, and there is no thermal impact on the high-tension conductive path 15.

Embodiment 3

Hereinafter, a wire harness according to Embodiment 3 will be described with reference to FIG. 6. FIG. 6 is a diagram illustrating the configuration of the wire harness according to Embodiment 3. The same reference numerals and signs will be assigned to basically the same configuration members as in Embodiments 1 and 2, and detailed description will be omitted.

Figure 6:
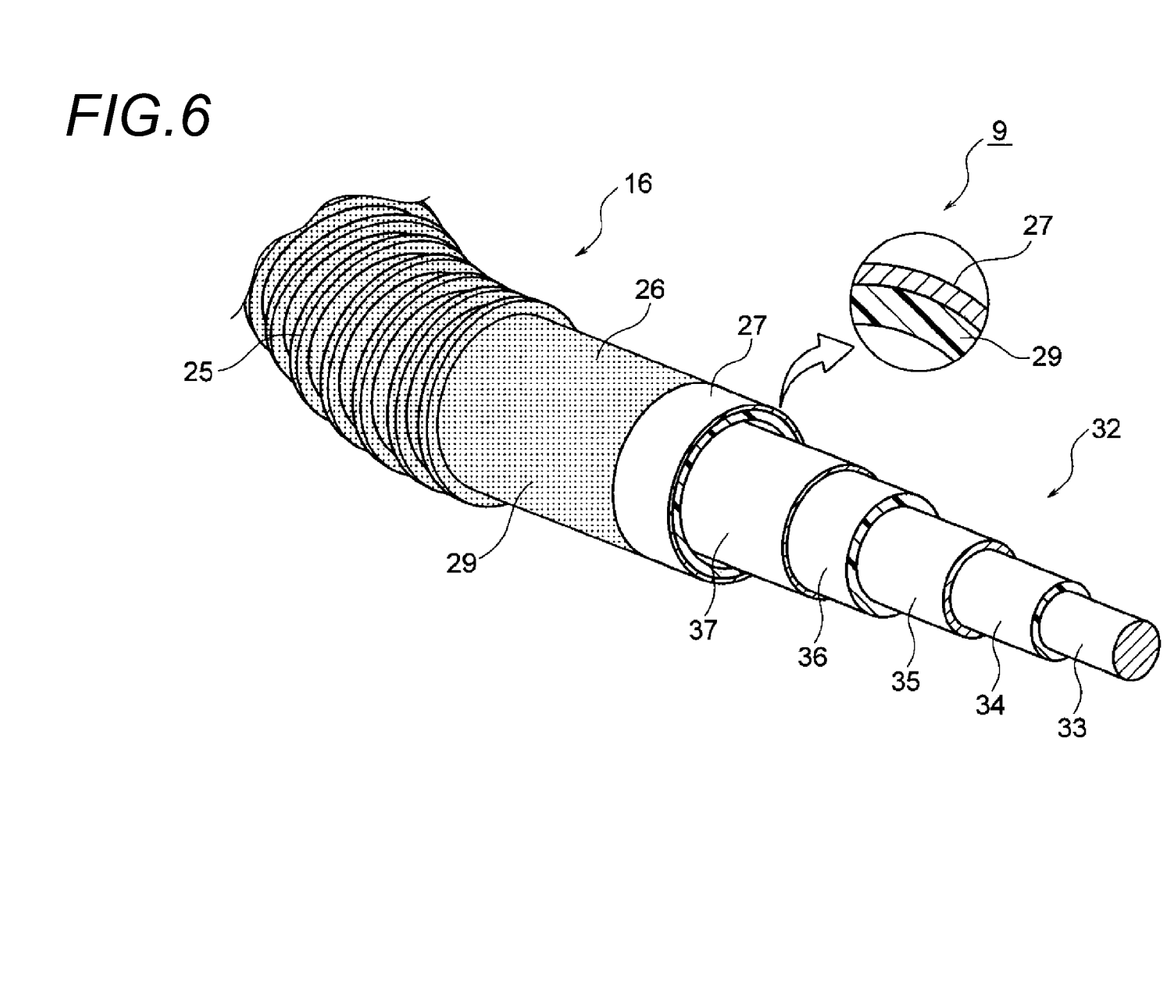
FIG. 6 is a diagram illustrating the configuration of a wire harness according to Embodiment 3.

In FIG. 6, the wire harness 9 includes the high-tension coaxial composite conductive path 32 which is a high-tension conductive path; the exterior member 16 that accommodates and protects the high-tension coaxial composite conductive path 32; and a shield connector (not illustrated) that is provided at the terminal of the high-tension coaxial composite conductive path 32. The plurality of heat reflecting portions 27 are provided in the exterior member 16. The plurality of identification portions 38 (refer to FIG. 3) are provided in the exterior member 16.

The high-tension coaxial composite conductive path 32 has a set of positive and negative circuits. That is, the high-tension coaxial composite conductive path 32 is configured to have a two-system circuit. Specifically, the high-tension coaxial composite conductive path 32 includes a first conductive path 33 having a circular cross section which is positioned at the center of the high-tension coaxial composite conductive path 32; a first insulator 34 having a predetermined thickness which covers an outer circumference of the first conductive path 33; a second conductive path 35 which is provided on an outer side of the first insulator 34; a second insulator 36 having a predetermined thickness which covers an outer circumference of the second conductive path 35; and a shielding member 37 having a cylindrical shape which is in close contact with an outer surface of the second insulator 36. The high-tension coaxial composite conductive path 32 may further include a sheath having a predetermined thickness which covers an outer circumference of the shielding member 37.

The shielding member 37 is made of a well-known braid, a well-known metal foil, or the like. In the disposition described above, the shielding member 37 is included in the configuration of the high-tension coaxial composite conductive path 32, but the shielding member 37 may be disposed as follows. That is, when the shielding member 37 is disposed, the size of the shielding member 37 may be a little large compared to that of the second insulator 36. The shielding member 37 formed to have a cylindrical shape may be in close contact with the outer surface of the second insulator 36, or the shielding member 37 may be in close contact with the outer surface of the second insulator 36 by winding a tape-like shielding member or a sheet-like shielding member around the second insulator 36.

In addition to the high-tension coaxial composite conductive path 32, a well-known shielded electric wire or the like is used as the conductive path. The number of high-tension coaxial composite conductive paths 32 is preferably at least one.

In Embodiment 3, the high-tension coaxial composite conductive path 32 is a two-system circuit, but is not limited to that, and may be a three-system circuit, or an n-system circuit. The n-system circuit is formed by adding circuits in a radially outward direction in such a manner that a single configuration is coaxially formed by the circuits.

Naturally, according to Embodiment 3, the same effects as in Embodiment 1 are obtained. That is, according to the wire harness 9, the following effects are obtained: the high-tension coaxial composite conductive path 32 is accommodated in the exterior member 16 made of a resin material which has a black color or a dark color close to the black color, thereby the inner and outer surfaces of the exterior member 16 have the black color, or the dark color close to the black color, and the exterior member 16 can more efficiently absorb heat originating from the high-tension coaxial composite conductive path 32, and can more efficiently radiate the heat to the outside.

According to the wire harness 9, the following effects are obtained: the wire harness 9 has the plurality of heat reflecting portions 27 on the outer side of the exterior member 16, thereby the heat reflecting portions 27 can reflect heat from the outside, and thermal impact on the high-tension coaxial composite conductive path 32 can be reduced or prevented.

In addition, according to the wire harness 9, the following effects are obtained: the wire harness 9 has the plurality of identification portions 38 (refer to FIG. 3) on the outer side of the exterior member 16, and thereby it is possible to identify that the high-tension coaxial composite conductive path 32 is accommodated and protected.

Naturally, various modifications can be made to the present invention insofar as the modifications do not depart from the intent of the present invention.

The following is a summary related to the wire harness according to the embodiments.

(1) A wire harness 9 according to embodiments is a wire harness that includes at least one conductive path (high-tension conductive path 5 or high-tension coaxial composite conductive path 32), and an exterior member 16 that accommodates and protects the conductive path. The exterior member 16 is a molded resin component made of a resin material which has a black color or a dark color close to the black color.

(2) In the wire harness 9 according to the embodiments, the exterior member 16 is formed to have a tubular shape.

(3) In the wire harness 9 according to the embodiments, the exterior member 16 includes a portion attached to a vehicle floor 11.

(4) In the wire harness 9 according to the embodiments, the exterior member 16 includes at least one of an identification portion 38 for identifying the conductive path, and a heat reflecting portion 27 for reflecting heat from outside.

(5) In the wire harness 9 according to the embodiments, the heat reflecting portion 27 (27a) is formed via bi-color molding.

(6) In the wire harness 9 according to the embodiments, the heat reflecting portion 27 (27a) is formed via painting or vapor deposition.

(7) In the wire harness 9 according to the embodiments, the heat reflecting portion 27 (27b, 27c) is formed as an add-on component or an add-on member which is added to an outer surface of the exterior member 16.

(8) In the wire harness 9 according to the embodiments, the heat reflecting portion 27 is formed as a portion which has a white color or a bright color close to the white color, or is formed as a portion which is also glossy.

(9) In the wire harness 9 according to the embodiments, the heat reflecting portion 27 is formed as a mirrored portion.

A wire harness according to the present invention is useful in that it is possible to efficiently absorb heat originating from a high-tension electric wire, and to radiate the heat to the outside.

What is claimed is:

1. A vehicle with a wire harness comprising:
   a heat source;
   at least one conductive path;
   at least one of a sheath, an insulator, or a shielding member surrounding the at least one conductive path; and
   an exterior member that accommodates and protects the conductive path and the at least one of a sheath, an insulator, or a shielding member, wherein
   the exterior member is a molded resin component made of a resin material which has at least two portions with a black color or a dark color close to the black color,
   wherein the exterior member includes, on an outer surface, at least two heat reflecting portions for reflecting heat from outside,
   wherein at least one heat reflecting portion of the heat reflecting portions is arranged on an area of the exterior member where the exterior member receives more heat than other areas of the exterior member, due to heat from the heat source, and
   wherein the black color or dark color portions and the heat reflecting portions are arranged on the exterior member so that the exterior member has a series of alternating black color or dark color portions and heat reflecting portions.

2. The vehicle with a wire harness according to claim 1, wherein the exterior member is formed to have a tubular shape.

3. The vehicle with a wire harness according to claim 1, wherein the exterior member includes a portion attached to a vehicle floor.

4. The vehicle with a wire harness according to claim 1, wherein the exterior member includes, on an outer surface, an identification portion for identifying the conductive path.

5. The vehicle with a wire harness according to claim 1, wherein the exterior member further comprises a bendable portion.

6. A vehicle with a wire harness comprising:
   a heat source;
   at least one conductive path;
   at least one of a sheath, an insulator, or a shielding member surrounding the at least one conductive path; and
   an exterior member that accommodates and protects the conductive path and the at least one of a sheath, an insulator, or a shielding member, wherein the exterior member is a molded resin component made of a resin material which has at least two portions with black color or a dark color close to the black color, wherein the exterior member includes, on an outer surface, at least two heat reflecting portions for reflecting heat from outside, wherein at least one heat reflecting portion of the heat reflecting portions is arranged on an area of the exterior member where the exterior member receives more heat than other areas of the exterior member, due to heat from the heat source, and wherein the heat reflecting portions are formed via bi-color molding, and wherein the black color or dark color portions and the heat reflecting portions are arranged on the exterior member so that the exterior member has a series of alternating black color or dark color portions and heat reflecting portions.

7. The vehicle with a wire harness according to claim 1, wherein the heat reflecting portions are formed via painting or vapor deposition.

8. The vehicle with a wire harness according to claim 1, wherein the heat reflecting portions are formed as add-on components or add-on members which are added to an outer surface of the exterior member.

9. The vehicle with a wire harness according to claim 1, wherein the heat reflecting portions are formed as portions which have a white color or a bright color close to the white color, or are formed as portions which are glossy.

10. The vehicle with a wire harness according to claim 8, wherein the heat reflecting portions are formed as mirrored portions.

* * * * *